US010943401B2

(12) United States Patent
Zhou et al.

(10) Patent No.: US 10,943,401 B2
(45) Date of Patent: Mar. 9, 2021

(54) ACTIVE VISUAL RECOGNITION IN MOBILE AUGMENTED REALITY

(71) Applicant: INTERNATIONAL BUSINESS MACHINES CORPORATION, Armonk, NY (US)

(72) Inventors: Bing Zhou, Port Jefferson Station, NY (US); Sinem Guven Kaya, New York, NY (US); Shu Tao, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/265,481

(22) Filed: Feb. 1, 2019

(65) Prior Publication Data

US 2020/0250890 A1    Aug. 6, 2020

(51) Int. Cl.
| | |
|---|---|
| *G06T 19/00* | (2011.01) |
| *G06T 7/70* | (2017.01) |
| *G06T 13/20* | (2011.01) |

(52) U.S. Cl.
CPC .............. *G06T 19/006* (2013.01); *G06T 7/70* (2017.01); *G06T 13/20* (2013.01);
(Continued)

(58) Field of Classification Search
CPC ......... G06T 19/006; G06T 7/70; G06T 13/20; G06T 2207/10016; G06T 2207/20084; G06T 2207/30244
See application file for complete search history.

(56) References Cited

U.S. PATENT DOCUMENTS

| | | |
|---|---|---|
| 8,379,014 B2 | 2/2013 | Wiedemann et al. |
| 8,452,080 B2 | 5/2013 | Engedal |
(Continued)

FOREIGN PATENT DOCUMENTS

KR    10-2009-0050567 A    5/2009

OTHER PUBLICATIONS

Deng et al., "ImageNet: A Large-Scale Hierarchical Image Database," IEEE Conference on Computer Vision and Pattern Recognition, 2009, p. 248-255, IEEE.
(Continued)

*Primary Examiner* — Haixia Du
(74) *Attorney, Agent, or Firm* — Kristofer L. Haggerty (57) ABSTRACT

A method, computer system, and a computer program product for intelligently generating an augmented reality (AR)-assisted repair guidance for a user is provided. The present invention may include detecting a scan of an object. The present invention may then include filtering one or more pose-controlled video frames. The present invention may also include extracting at least one new image feature by utilizing a convolutional neural network (CNN) based on the filtered one or more pose-controlled video frames. The present invention may also include aggregating a plurality of visual information associated with the object by utilizing the CNN, wherein the extracted at least one new image feature is included in the aggregated plurality of visual information. The present invention may further include presenting three dimensional (3D) animated instructions to the user, wherein the 3D animated instructions include an AR-assisted repair guidance for the object.

17 Claims, 5 Drawing Sheets

(52) U.S. Cl.
CPC ............... *G06T 2207/10016* (2013.01); *G06T 2207/20084* (2013.01); *G06T 2207/30244* (2013.01)

(56) References Cited

U.S. PATENT DOCUMENTS

| | | | |
|---|---|---|---|
| 8,503,760 | B2 | 8/2013 | Lee et al. |
| 9,472,028 | B2 | 10/2016 | Abdel-Rahman et al. |
| 9,697,432 | B2 | 7/2017 | Bastide et al. |
| 10,706,633 | B2 | 7/2020 | Schell |
| 2010/0304787 | A1* | 12/2010 | Lee .................. G06Q 30/06 455/556.1 |
| 2012/0237085 | A1 | 9/2012 | Meier |
| 2016/0140719 | A1* | 5/2016 | Lucey .................. G06T 7/62 382/154 |
| 2017/0352282 | A1 | 12/2017 | Anderson et al. |
| 2019/0026538 | A1* | 1/2019 | Wang .................. G06T 7/20 |
| 2020/0026257 | A1 | 1/2020 | Dalal et al. |

OTHER PUBLICATIONS

Hagbi et al., "Shape Recognition and Pose Estimation for Mobile Augmented Reality," IEEE International Symposium on Mixed and Augmented Reality, Oct. 19-22, 2009, p. 65-71, Orlando, Florida, USA.

He et al., "Deep Residual Learning for Image Recognition," IEEE Conference on Computer Vision and Pattern Recognition, 2016, p. 770-778, IEEE Computer Society.

Henderson et al., "Augmented Reality for Maintenance and Repair (ARMAR)," Air Force Research Laboratory Technical Report, Aug. 2007, p. 1-62, Report No. AFRL-RH-WP-TR-2007-0112, Columbia University.

Jayaraman et al., "End-To-End Policy Learning for Active Visual Categorization," IEEE Transactions on Pattern Analysis and Machine Intelligence, 2018, p. 1-14.

Klein et al., "Parallel Tracking and Mapping for Small AR Workspaces," 6th IEEE and ACM International Symposium on Mixed and Augmented Reality, 2007, 10 Pages, IEEE.

Mell et al., "The NIST Definition of Cloud Computing," National Institute of Standards and Technology, Sep. 2011, p. 1-3, Special Publication 800-145.

Oda et al., "Poster: 3D Referencing for Remote Task Assistance in Augmented Reality," IEEE Symposium on 3D Use Interfaces, Mar. 16-17, 2013, p. 179-180, Orlando, FL, USA.

Su et al., "Multi-View Convolutional Neural Networks for 3D Shape Recognition," IEEE International Conference on Computer Vision, 2015, p. 945-953, IEEE Computer Society.

Zhou et al., "Poster: Pose-assisted Active Visual Recognition in Mobile Augmented Reality," MobiCom '18, Oct. 29-Nov. 2, 2018, p. 756-758, ACM, New Delhi, India.

* cited by examiner

ACTIVE VISUAL RECOGNITION IN MOBILE AUGMENTED REALITY

BACKGROUND

The present invention relates generally to the field of computing, and more particularly to augmented reality.

In the technical support domain, augmented reality (AR) research has been utilized to provide hardware repair guidance for users. The existing utilization of AR in hardware repair guidance (i.e., AR-assisted repair guidance) has been limited to more experienced users, who are able to analyze the current scene or state of the repair, and manually choose the applicable set of instructions to view through AR. Such existing approaches may be cumbersome from a user experience point of view, as well as only effective if the user possesses sufficient knowledge of the repair steps to judge where the user is in the process. Therefore, such existing approaches may limit the user set to relatively experienced users.

SUMMARY

Embodiments of the present invention disclose a method, computer system, and a computer program product for intelligently generating an augmented reality (AR)-assisted repair guidance for a user. The present invention may include detecting a scan of an object on a user mobile device. The present invention may then include filtering one or more pose-controlled video frames, wherein the filtered one or more pose-controlled video frames include the object. The present invention may also include extracting at least one new image feature by utilizing a convolutional neural network (CNN) based on the one or more filtered pose-controlled video frames. The present invention may also include aggregating a plurality of visual information associated with the object by utilizing the CNN, wherein the extracted at least one new image feature is included in the aggregated plurality of visual information. The present invention may further include presenting three dimensional (3D) animated instructions to the user, wherein the 3D animated instructions include an AR-assisted repair guidance for the object.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for intelligently generating an AR-assisted repair guidance for one or more users. As such, the present embodiment has the capacity to improve the technical fields of augmented reality (AR) and hardware repair by utilizing AR assistance to overlay the real world with virtual material, to provide more intuitive and ongoing step-by-step 3D animated instructions on hardware, and to provide fine-grained visual recognition. More specifically, an object scan may be detected, and the intelligent AR-assisted repair guidance program may then filter a pose-controlled video frame by calibrating an initial pose, clustering and aggregating an informative pose, and filtering the video frames for the most stable video frames. Then, the intelligent AR-assisted repair guidance program may identify and extract a new image feature from the set of filtered video frames by utilizing a convolutional neural network (CNN). Then, the visual information may be aggregated to identify the appropriate state of the repair action for the object. Then, the intelligent AR-assisted repair guidance program may present 3D animated instructions for the user to repair the scanned object.

As previously described, in the technical support domain, augmented reality (AR) research has been utilized to provide hardware repair guidance for users. The existing utilizations of AR in hardware repair guidance (i.e., AR-assisted repair guidance) has been limited to more experienced users, who are able to analyze the current scene or state of the repair, and manually choose the applicable set of instructions to view through AR. Such existing approaches may be cumbersome from a user experience point of view, as well as only effective if the user possesses sufficient knowledge of the repair steps to judge where the user is in the process. Therefore, such existing approaches may limit the user set to relatively experienced users.

Therefore, it may be advantageous to, among other things, have an intelligent AR-assisted repair guidance program that may be utilized by users of all levels. Such an intelligent AR-assisted repair guidance program may include automatically understanding the particular state of repair action to present the one or more users with the right set of instructions, thereby providing true value to AR-assisted repair and creating efficient and effective AR-assisted learning experiences. Additionally, the use of AR research has led to a more intuitive and engaging experience by superimposing step-by-step three dimensional (3D) animated instructions directly on top of the hardware the technician is aiming to repair.

According to at least one embodiment, the intelligent AR-assisted repair guidance program may recognize the state of the machine or hardware under repair by following three functionalities: (1) automatically present corresponding augmented reality (AR) instructions; (2) verify that all pre-requisites may be satisfied to move to the next step; and (2) recognize the state of the machine or hardware after an interrupted repair process.

According to at least one embodiment, the intelligent AR-assisted repair guidance program may scan an object with a user mobile device (i.e., mobile device). Prior to the scan of the object, the intelligent AR-assisted repair guidance program may include a complete set of informative video frames, from which the intelligent AR-assisted repair guidance program may automatically select the most informative video frames for recognition. The most informative video frames may be selected based on the pose of the device, which is available from the AR session.

According to at least one embodiment, the intelligent AR-assisted repair guidance program may include a pose-assisted video frame filtering approach for fine-grained visual recognition. The present embodiment may also include the identification of points of interest (POIs), which are sub-areas of the object whose appearance is subject to change. The POIs may be learned from video data by comparing the delta changes between the states of the repair action.

According to at least one embodiment, the intelligent AR-assisted repair guidance program may include the design clustering based algorithm for finding pose groups, from which the POIs are observable to the camera. Additionally, the intelligent AR-assisted repair guidance program may utilize at least one frame filtering algorithm with pose clustering and one or more inertial sensors based best frame selection. As such, the user may have to sufficiently scan each POI, with a mobile device, and simultaneously record the camera pose data. Then, the pose data may be automatically clustered and the boundaries may be determined.

According to at least one embodiment, the intelligent AR-assisted repair guidance program may leverage the pose data (motion/rotation speeds and 3D positions) for selecting the best quality video frames. The intelligent AR-assisted repair guidance program may keep track of the six degrees of freedom (6-DOF) pose data (i.e., the images associated with the pose data may be free to change position as forward/backward (surge), up/down (heave), left/right (sway) translation in three perpendicular axes, combined with changes in orientation through rotation about three perpendicular axes, such as yaw (normal axis), pitch (transverse axis) and roll (longitudinal axis)) via simultaneous localization and mapping (SLAM) algorithms, which is enabled by the fusion of visual perception and inertial sensors. The intelligent AR-assisted repair guidance program may utilize the leveraged AR pose tracking for fine-grained active visual recognition. Additionally, the accuracy of the AR pose tracking may be from visual information and the inertial sensors, thereby providing extra input information for state recognition beyond vision. The present embodiment may include generating training samples for all POI image groups using a combination of randomly drawn video frames.

According to at least one embodiment, the intelligent AR-assisted repair guidance program may use virtual POI indicators in AR to guide the user to move the mobile device to collect complete visual information for recognizing and ensuring accuracy. Such use of virtual POI indicators may be performed dynamically based on the current state of the object. Additionally, the intelligent AR-assisted repair guidance program may only show the POI indicators that have changes for completing current maneuvers.

According to at least one embodiment, the intelligent AR-assisted repair guidance program may include pose-controlled video frame filtering, which includes selecting the most informative video frames at certain poses while the mobile device is scanning the object. Video frame filtering may include three steps: (1) initial pose calibration; (2) informative pose clustering and aggregation; and (3) video frame filtering.

According to at least one embodiment, during the initial pose calibration, the intelligent AR-assisted repair guidance program may ensure that both the object and the mobile device are in the same coordinate for consistent initial relative pose by the user holding the mobile device at a fixed location relative to the object, and resetting the tracking coordinates to the origin.

According to at least one embodiment, during the informative pose clustering and aggregation, the intelligent AR-assisted repair guidance program may determine the most informative camera poses where the captured video frames best distinguish multiple states of the object. These poses may be automatically generated by clustering and aggregating poses that capture changes between different states. Human knowledge of the data collection may be assumed for informative pose clustering and aggregation, and the user may have to move the mobile device around the areas where appearance changes occur while focusing the camera on these areas. The intelligent AR-assisted repair guidance program may determine the clusters for each state of change. The clusters may then be aggregated by merging the clusters that are close (e.g., two clusters that are adjacent to each other in terms of physical locations in six-dimensional (6D) space, which is 3D location and 3D orientation) to each other to minimize the total video frames filtered for complete state recognition. The locations on the object that have appearance changes, during the repair process, may be defined as individual POIs. If, however, some of the locations are close enough to be captured in a single camera view, then these locations may be defined as one aggregated POI. For example, the pose clusters are aggregated and merged, then multiple POIs will be easily captured in one single view, if the POIs are close to each other.

According to at least one embodiment, during the video frame filtering, the intelligent AR-assisted repair guidance program may fetch video frames when the mobile device is within a certain pose cluster. To ensure the quality of the captured video frames, the intelligent AR-assisted repair guidance program may further leverage inertial sensors (e.g., accelerometer, gyroscope) for filtering the most stable video frames (i.e., video frames captured when minimum acceleration and rotation is observed may be considered as the most stable and thus selected as input) when the mobile device is within a cluster. Each video frame may include data associated with the pose (e.g., acceleration, rotation, motion of the user mobile device when the video frame is captured) (i.e., pose data). Therefore, based on the pose data, the corresponding video frames may automatically be captured and sorted while the device is scanning the object.

The present embodiment may support partial updates of the pose data. As such, the user may not have to scan every pose each time. According to at least one embodiment, the intelligent AR-assisted repair guidance program may utilize a convolutional neural network (CNN) based image feature extraction to update a new image from any pose cluster, and may reuse previous extracted features if no image updates are available. The CNN, for example, may utilize a 2048 feature vector for each input image, and any change to a feature vector will be identified. The previous image from the pose cluster may be removed and the updated image may be extracted and included in the pose cluster. Therefore, the CNN based image feature extraction may save computation complexity and battery life on mobile devices.

According to at least one embodiment, a deep learning neural network may be designed for aggregating visual information from filtered video frames for final classification. The intelligent AR-assisted repair guidance program may aggregate the extracted image features in a standalone deep neural network. The extracted image features may then be concatenated as input for the deep learning neural network (i.e., aggregation model), and the output may be a recognized state. The intelligent AR-assisted repair guidance program may run the deep learning neural network, in real time, whenever an update is identified from the extracted input features.

According to at least one embodiment, the intelligent AR-assisted repair guidance program may be capable of recognizing very fine-grained details of a complex 3D object (e.g., a removed screw from a machine) with robustness, precise accuracy for state recognition, and conservative resource consumption (e.g., no overheating) with moderate CPU usage (e.g., less than 12%), moderate memory usage (e.g., less than 33 megabytes (MB) more memory on average), and moderate process time or CPU frame time (e.g., less than 11.4 milliseconds (ms) even when the deep learning neural network is running in the background and thus achieving 70 frame per second (fps) during that time). As such, the intelligent AR-assisted repair guidance program may be utilized in various AR-assisted repair work (e.g., general hardware maintenance, vehicles, electronics, furniture assembly), education (e.g., handcraft making), and entertainment and gaming (e.g., augmented reality (AR)/virtual reality (VR) games which require scene understanding).

Figure 1:
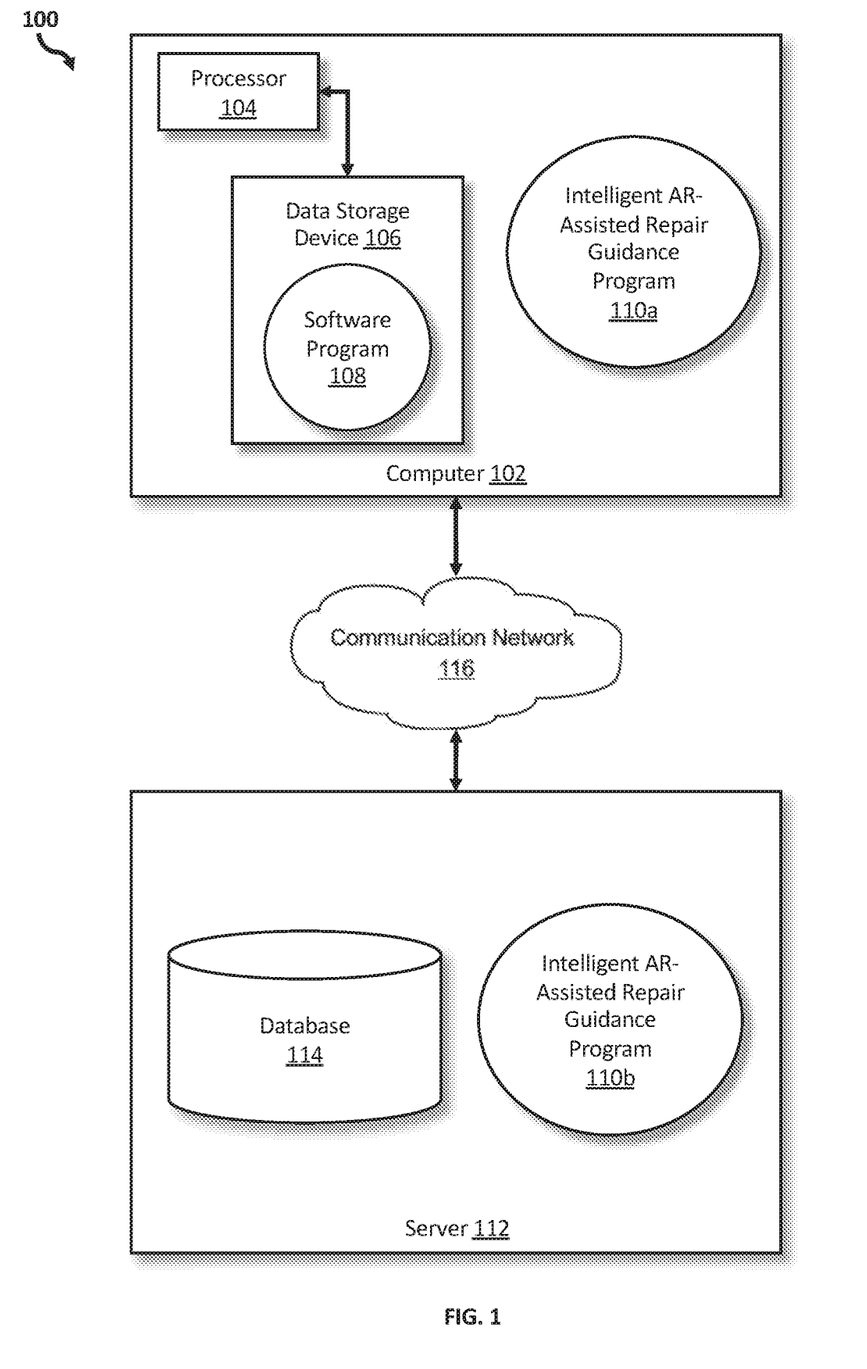
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an intelligent AR-assisted repair guidance program 110a. The networked computer environment 100 may also include a server 112 that is enabled to run an intelligent AR-assisted repair guidance program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the intelligent AR-assisted repair guidance program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the intelligent AR-assisted repair guidance program 110a, 110b (respectively) to intelligently provide AR-assisted repair guidance. The intelligent AR-assisted repair guidance method is explained in more detail below with respect to FIG. 2.

Figure 2:
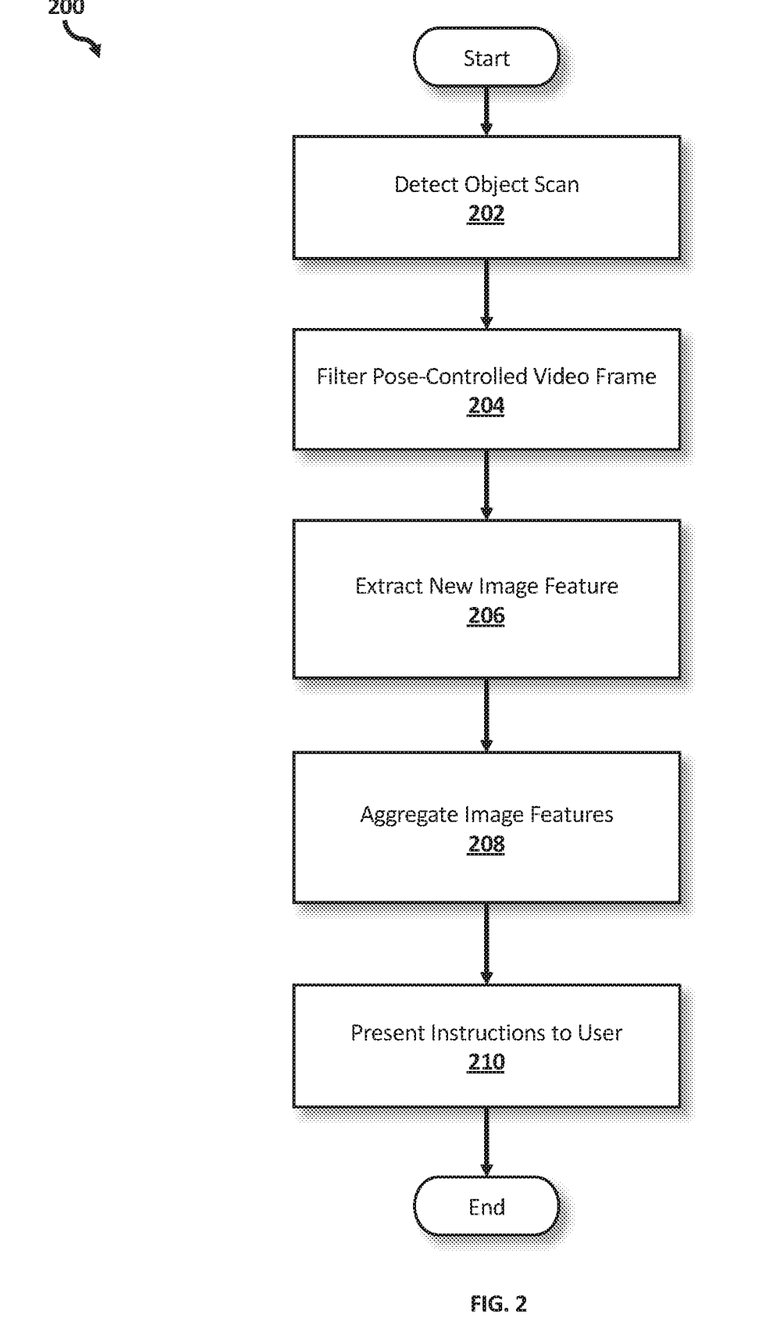
FIG. 2 is an operational flowchart illustrating the pose-assisted active visual recognition process according to at least one embodiment.

Referring now to FIG. 2, an operational flowchart illustrating the exemplary pose-assisted active visual recognition process 200 used by the intelligent AR-assisted repair guidance program 110a, 110b according to at least one embodiment is depicted.

At 202, an object scan is detected. Using a software program 108 on the user's mobile device (e.g., user's computer 102), a scan of the object (i.e., object scan) may be detected as input into the intelligent augmented reality (AR)-assisted repair guidance program 110a, 110b via communication network 116. The object scan may be detected and received by the intelligent AR-assisted repair guidance program 110a, 110b.

The user, for example, may turn on or activate the intelligent AR-assisted repair guidance program 110a, 110b, and may hold a camera associated with the user mobile device in close proximity to the object. The intelligent AR-assisted repair guidance program 110a, 110b may then prompt (e.g., via dialog box) the user to indicate whether the user is starting a scan of the object. The dialog box, for example, may include a "Yes" and a "No" button located at the bottom of the dialog box. If the user clicks the "Yes" button, then the intelligent AR-assisted repair guidance program 110a, 110b may commence the object scan, and begin the pose-assisted active visual recognition process 200. If, however, the user clicks the "No" button, then the intelligent AR-assisted repair guidance program 110a, 110b may not start the pose-assisted active visual recognition process 200. The intelligent AR-assisted repair guidance program 110a, 110b may continue to monitor the activity on the user mobile device until another object scan is detected.

In at least one embodiment, the user may indicate that the object scan has commenced without a prompt from the intelligent AR-assisted repair guidance program 110a, 110b. For example, once the object scan is detected, then the user may click a "Scan" button (or similarly indicated button, such as a red circle or "Start" button) located on the bottom of the screen. In some embodiments, the user may, for example, tap at least one finger onto the screen over the object scan to indicate that the object scan should commence.

For example, User A noticed that the door knob for User A's house is not working properly. However, User A has never repaired a door knob and does not know why the door knob is malfunctioning. As such, User A turns on the camera associated with User A's smart phone and aims the smart phone at the malfunctioning door knob. Once the intelligent AR-assisted repair guidance program 110a, 110b detects that User A may be scanning an object, the intelligent AR-assisted repair guidance program 110a, 110b prompts the User A to confirm that User A intends to scan the door knob by tapping one finger onto User A's smart phone screen. User A then taps one finger accordingly.

Next at 204, a pose-controlled video frame is filtered. The intelligent AR-assisted repair guidance program 110a, 110b may select the most informative video frames at certain poses while the user mobile device continues the object scan by calibrating the initial pose, clustering and aggregating the informative poses and filtering the video frame. First, the intelligent AR-assisted repair guidance program 110a, 110b may calibrate the initial pose by utilizing augmented reality (AR) pose tracking to instruct the user to hold the user mobile device, with one or more cameras (e.g., one or more 6-DOF cameras) at a fixed location relative to the object during the object scan. Therefore, the object and the user mobile device may be in the same coordinate for a consistent initial relative pose. The intelligent AR-assisted repair guidance program 110a, 110b may then reset the AR pose tracking coordinates to the origin. The initial pose calibration may further enable the intelligent AR-assisted repair guidance program 110a, 110b to create fine-grained visual recognition of objects, which leads to accurate object classification.

In at least one embodiment, the intelligent AR-assisted repair guidance program 110a, 110b may utilize a virtual assistant to provide instructions on how the user should hold the user mobile device. The virtual assistant may provide such instructions by auditory means (e.g., via microphone, head phones), visual means (e.g., via projecting written instructions on the screen of the user mobile device), or both auditory and visual means. In some embodiments, the visual means may include symbols (e.g., red "X" when the user is improperly holding the user mobile device, arrows to indicate the direction that the user may move the user mobile device, a green checkmark when a pose is successfully completed, or a stop sign when the user should stop moving the user mobile device).

In at least one embodiment, the intelligent AR-assisted repair guidance program 110a, 110b may directly provide instructions via auditory means (e.g., via microphone, head phones) and/or visual means (e.g., via projecting written or symbolic instructions on the screen of the user mobile device) to the user.

Since the initial pose calibration may lead to the generation of multiple informative poses of the object, the intelligent AR-assisted repair guidance program 110a, 110b may then cluster and aggregate the set of informative poses and determine the most informative camera poses (i.e., the video frames with the most details to best distinguish one or more states of the object). The intelligent AR-assisted repair guidance program 110a, 110b may automatically generate poses by clustering and aggregating poses that capture changes between the different states of the object. While performing the object scan, the user may identify points of interests (POIs) or sub-areas of the object where the appearance of the object is subject to changes. As such, the user may move the user mobile device around the areas of the object, where the appearance of the object changes, while focusing the camera on the changes of the object.

In at least one embodiment, the intelligent AR-assisted repair guidance program 110a, 110b may, by utilizing a machine learning (ML) model (i.e., a process in which an enormous amount of data may be fed into a computer algorithm and the computer analyzes and makes data-driven recommendations and decisions based on only the input data, and any changes identified are incorporated to improve future recommendation and decision-making), learn the POIs without human knowledge, observation or identification of the POIs. The intelligent AR-assisted repair guidance program 110a, 110b may train the ML model by comparing and analyzing the delta changes derived by the video data from each state. The trained ML model may then produce a proper output that identified the POIs associated with the object.

In at least one embodiment, the intelligent AR-assisted repair guidance program 110a, 110b may utilize the trained ML model while initially calibrating the poses. The trained ML model may be utilized to direct the user on which parts of the object to capture, thereby ensuring that any POIs may be captured in one or more video frames.

From state ($S_{i-1}$) to state ($S_i$), the intelligent AR-assisted repair guidance program 110a, 110b may have a group of viewing poses $\{p_j^i\}$ for each local area ($L_j$), where the appearance changes occur. The intelligent AR-assisted repair guidance program 110a, 110b may utilize a clustering algorithm $\{p_j^i\}$ to find the boundary of the pose region for each $L_j$. Based on the user's observations or the trained ML model, the images (j) may include the fully captured changes from $S_{i-1}$ to $S_i$. The intelligent AR-assisted repair guidance program 110a, 110b may then determine the clusters for each state change, and then aggregate the clusters by merging the clusters that are close to each other to minimize the total video frame filtered for complete state recognition.

Then, the intelligent AR-assisted repair guidance program 110a, 110b may filter the video frames by utilizing AR pose tracking from the clustered and aggregated informative poses. The intelligent AR-assisted repair guidance program 110a, 110b may retrieve (i.e., fetch) video frames when the user mobile device is in a certain pose cluster. Based on the pose data associated with each video frame, the video frames may be automatically captured and sorted when the user mobile device is scanning the object. To preserve the quality of the captured video frames, the intelligent AR-assisted repair guidance program 110a, 110b may utilize inertial sensors (e.g., gyroscope, accelerometer) for filtering the most stable video frames (i.e., captured video frames where minimum acceleration and rotation is observed and thus, selected as input) in each cluster. For example, whether the user's hands were shaking, or the user mobile device was in motion while a video frame was captured are included as a part of the pose data associated with the motion, acceleration or speed of the user mobile device as determined by the inertial sensors. The higher the motion, rotation speed or acceleration, the lesser the quality of the video frame.

Continuing the previous example, the intelligent AR-assisted repair guidance program 110a, 110b then utilizes a virtual assistant to provide audio instructions to User A on how to hold the smart phone for the intelligent AR-assisted repair guidance program 110a, 110b to capture a consistent pose of the door knob. The intelligent AR-assisted repair guidance program 110a, 110b instructs User A to capture different angles of the door knob as well as to hold the smart phone without shaking User A's hands or abruptly moving the smart phone during a pose. Within five minutes, the intelligent AR-assisted repair guidance program 110a, 110b captured multiple poses of the malfunctioning door knob and more than 200 total video frames. The intelligent AR-assisted repair guidance program 110a, 110b then clusters and aggregates the video frames, and then determines which of the captured video frames are the most informative. Of the 200 captured video frames, the intelligent AR-assisted repair guidance program 110a, 110b selects 120 most informative video frames. Then, the intelligent AR-assisted repair guidance program 110a, 110b filters the most informative video frames to select the most stable video frames with the lowest pose data related to acceleration, motion or rotation. Of the 120 most informative video frames, the intelligent AR-assisted repair guidance program 110a, 110b selects 75 most stable video frames. Therefore, the video frames are filtered from 200 to 75 most stable and most informative video frames.

In another embodiment, the user may be prompted (e.g., via dialog box) by the intelligent AR-assisted repair guidance program 110a, 110b to provide a reason for commencing the object scan, when the object scan is detected. The reason may include an issue or a problem observed by the user that would indicate the need for repairs to the scanned object. For example, the user will type into the dialog box "malfunctioning door knob," "door will not close," or "jammed latch bolt". The intelligent AR-assisted repair guidance program 110a, 110b may utilize this reason from the user to determine the recognized state of the object or potential POIs for the video frames. In some other embodiment, the intelligent AR-assisted repair guidance program 110a, 110b may provide possible reasons for commencing the object scan to the user, The user may, for example, click on the most likely reason, or the issue or problem, observed by the user.

Then, at 206, an image feature is extracted. The intelligent AR-assisted repair guidance program 110a, 110b may utilize a convolutional neural network (CNN) to identify each image feature associated with each filtered video frame, and to further identify and extract the new image feature. The CNN may utilize a machine learning (ML) model to compare images by dividing the image into a series of pieces or features, and may compare the pieces or features of each image to identify or classify whether the image includes an image feature or not. If, for example, the CNN, receives as input an image of a pineapple, then the CNN may divide the image into multiple pieces or features, such as the colors of the pineapple, the shape of the pineapple and the texture of the pineapple, and then the CNN will compare that image of the pineapple to a previously received image of another pineapple to determine whether there are any differences in the multiple features or pieces. The output of the CNN would be whether there were any differences between the images, or whether the images were exactly the same. To perform image recognition and classification, the CNN may train a core ML model to label the input signal (i.e., set of filtered video frames) with a series of particular image features associated with the object by referring to historical data associated with previous video frames, previous images in the previous video frames, identified POIs for each object, and final identification of each set of image features associated with the object. The trained core ML model may produce as a proper output the image features identified in each image in each video frame. Based on the identified image features produced by the trained core ML model, the CNN, by utilizing the trained core ML model, may further determine whether a new image feature is identified. Any new image feature may then be extracted by the trained core ML model.

First, the trained core ML model may separate the set of filtered video frames into individual video frames. Using a software program 108 on the user's mobile device (e.g., user's computer 102), the set of filtered video frames may be uploaded into the CNN by the intelligent AR-assisted repair guidance program 110a, 110b. The CNN may be utilized to divide the filtered video frames into individual video frames, and then to identify the images contained in each video frame. The CNN may train a core ML model by parsing through each set of filtered video frames and comparing historical data associated with previous sets of filtered video frames and the final breakdown of the individual video frames from the previous sets of filtered video frames to identify the individual video frames contained in each current set of filtered video frames. The trained core ML model may produce as a proper output the identified individual video frames from each current set of filtered video frames.

Then, the CNN may then train the core ML model to identify the images contained within each current individual video frame. The training process may include the core ML model parsing through each video frame and comparing the historical data on the previous video frames and the final classification of the images contained within the previous video frames. The trained core ML model may then produce as a proper output the identified images contained within each current individual video frame. Each identified image may be classified into an object category with multiple image features associated with each object category. For example, if the image is identified and then classified as a pencil, then the multiple image features associated with a pencil, such as wooden composition, yellow color, sharpness of the lead point, and an eraser on one end of the point, may be applied to the identified image.

Then, the CNN may further train the core ML model to identify the image features contained within each image of this particular video frame. The core ML model may be trained by parsing through the each image and comparing the historical data on the previous images and final classification of image features contained within the previously identified image. Therefore, the trained core ML model may produce an output of the image features associated with this particular image of each video frame.

In at least one embodiment, the intelligent AR-assisted repair guidance program 110a, 110b may utilize ResNet-50 (i.e., a pretrained CNN that is trained on more than a million images from the ImageNet database) in which the last softmax layer of ResNet-50 may be removed to generate a 2048 feature vector for each input image.

Additionally, based on a comparison of the identification of the image features by the trained core ML model and the previously identified image features associated with the object, the trained core ML model may determine whether a new image feature has been identified. The trained core ML model, utilized by the CNN, may run only when there is a new image feature identified from any pose cluster (i.e., filtered video frame). The trained core ML model, utilized by the CNN, may support partial updates (e.g., uploading a small portion of the camera poses that are associated with only the changes or POIs). As such, the user may not have to scan every pose each time. If a new image feature is identified by the trained core ML model, then the new image feature may be extracted from the filtered video frames associated with the object.

If, however, no new image feature is identified, then the intelligent AR-assisted repair guidance program 110a, 110b may re-use previous extracted image features. Therefore, the intelligent AR-assisted repair guidance program 110a, 110b may utilize minimal computation complexity and battery life on user mobile devices.

In at least one embodiment, a DNN (formerly DotNet-Nuke®) (DotNetNuke and all DotNetNuke-based trademarks and logos are trademarks or registered trademarks of DNN Corp., and/or its affiliates) platform may be utilized to increase server and/or client side functionality, as well as a core framework for providing support to a modular structure for the trained core ML model.

Continuing the previous example, the intelligent AR-assisted repair guidance program 110a, 110b utilizes the CNN to divide the set of 75 most stable and most informative filtered video frames into 75 individual video frames. Each of the individual video frames is further broken down into the images contained in the video frames, which is a door knob. Based on historical data, the object, a door knob, contains several image features, such as a lip, latch bolt, deadbolt, latch assembly, strike, strike plate, interior knob, exterior knob, slot, spindle and rose. The positions of each of the several image features are identified and based on the position of each of the image features, there is a determination as to whether the door knob was in working order. The CNN utilized a pretrained core ML model to identify the image features in the door knob images from the 75 individual video frames. The pretrained core ML model then identifies a new image feature, the latch bolt remains in the retract position in the faceplate of the door knob, from 15 of the individual video frames. The image feature of the jammed latch bolt is extracted as a new image update from the pose cluster.

Then, at 208, the visual information is aggregated. The intelligent AR-assisted repair guidance program 110a, 110b may combine the identified and extracted image features from each individual video frame (e.g., visual information) in a standalone deep neural network. The standalone neural network (i.e., aggregation model) may be utilized for aggregating the visual information from the filtered video frames for final classification.

First, the intelligent AR-assisted repair guidance program 110a, 110b may concatenate the image features in a series or chain of events. By comparing historical data associated with the object and the series of image features associated with the object, the intelligent AR-assisted repair guidance program 110a, 110b may be able to link together in a chain or series the identified image features (including the extracted new image feature) contained in the set of filtered video frames.

In at least one embodiment, if the object is moving or in motion, the intelligent AR-assisted repair guidance program 110a, 110b may link together the image features based on a sequence of events while the object is in motion. For example, if the object is a door knob that is turning to open a door, then the intelligent AR-assisted repair guidance program 110a, 110b will link together the image features based on the order in which the events happened (e.g., $Event_1$, $Event_2$ ..., $Event_n$) during the time period in which the video frames are captured.

Then, using a software program 108 on the user's mobile device (e.g., user's computer 102), the concatenated image features from the filtered video frames may be uploaded as input into the aggregation model by the intelligent AR-assisted repair guidance program 110a, 110b. The aggregation model may then compare the historical data associated with previous video frames, identified POIs for each object, identified image features, and final classification of each image feature with a particular state associated with the object, with the concatenated image features of the recently filtered video frames. By utilizing pattern recognition, the aggregation model may then fully connect the image features to determine the sequence of events or image features for each of the video frames, and may omit any duplicate or redundant image features. The aggregation model may then determine the state or states associated with each image feature contained within the set of filtered video frames. The output of the aggregation model may be a recognized state associated with the extracted new image feature.

Continuing the previous example, the intelligent AR-assisted repair guidance program 110a, 110b then links together the image features, lip, latch bolt, deadbolt, latch assembly, strike, strike plate, interior knob, exterior knob, slot, spindle and rose, included in the filtered video frames. As such, the linked image features are then fed into the aggregation model in which the historical data associated with the previous video frames of door knobs, and the corresponding image features are compared with the recently linked image features and video frames taken by User A. The output of the aggregation model is that the latch bolt is jammed in the face plate and should be removed from the retract position.

Then, at 210, instructions are presented to the user. Based on the recognized state associated with the extracted new image feature, the intelligent AR-assisted repair guidance program 110a, 110b may automatically determine the current state of repair action necessary for the object. Through the use of three dimensional (3D) animation, the intelligent AR-assisted repair guidance program 110a, 110b may then render a step-by-step process to provide efficient and effective AR-assisted guidance to the user on how to repair the object in which the 3D animated instructions may be superimposed directly on top of the screen of the user mobile device. In addition, an image of the hardware (i.e., object) that the user intends to repair may also be shown on the screen of the user mobile device.

In at least one embodiment, the intelligent AR-assisted repair guidance program 110a, 110b may provide scene kits (e.g., list of tools or supplies) that may be necessary to repair the object.

In some embodiments, the intelligent AR-assisted repair guidance program 110a, 110b may include, for example, a "Completed" button (or green check mark) at the end of each instruction in which the user may click to indicate that the user has completed that step. As such, the intelligent AR-assisted repair guidance program 110a, 110b may proceed to next instruction and utilize 3D animation to indicate how the user may complete the following step.

In at least one embodiment, after each step is completed, the intelligent AR-assisted repair guidance program 110a, 110b may remove that step from the screen of the user mobile device. In some other embodiments, the completed step may remain on the screen of the user mobile device and may be marked as completed by highlighting the text of the completed step in a lighter color. The current step may be indicated by the intelligent AR-assisted repair guidance program 110a, 110b highlighting that text in a different color from the text associated with the other steps.

In at least one embodiment, the intelligent AR-assisted repair guidance program 110a, 110b may verify that the pre-requisites of a step are satisfied prior to proceeding to the next step. By utilizing a software program 108 on the user's mobile device (e.g., user's computer 102) (i.e., recognition software), the intelligent AR-assisted repair guidance program 110a, 110b may verify the steps of the user by determining if the user is performing an incorrect or unintended action and if the pre-requisites of each step have been completed. The recognition software may monitor the activity of the user and the tools used by utilizing one or more cameras associated with the user mobile device, to determine what the user is interacting with as compared to what the user should be interacting with in the real world. The recognition software may identify the tools, used by the user in a particular state, in the image and may compare the identified tools with images of known tools that may be used to repair the object during that particular step or state. The recognition software may then determine whether the correct tools (i.e., proper tools) are being utilized during that particular state or step. For example, the recognition software may determine whether the user is utilizing the correct tools during the particular state, as well as whether the object at the current state matches the images, provided by the intelligent AR-assisted repair guidance program 110a, 110b, of what the object should be in the recognized state. Based on the monitored user activity, the intelligent AR-assisted repair guidance program 110a, 110b may determine whether the user is following the 3D animated instructions provided by the intelligent AR-assisted repair guidance program 110a, 110b, whether the pre-requisites of the step have been satisfied (e.g., if the object images of the current state matches the intended object images of the recognized state), and whether the correct tools are being used by the user. If the intelligent AR-assisted repair guidance program 110a, 110b determines that the user is following the 3D animated instructions, each pre-requisite of the current step has been satisfied and the user is utilizing the correct tools, then the intelligent AR-assisted repair guidance program 110a, 110b may prompt the user to move to the next step.

In some embodiments, if the recognition software, utilized by the intelligent AR-assisted repair guidance program 110a, 110b, determines that the user is not following the 3D animated instructions, one or more pre-requisites of the current step is unsatisfied, or the user is not utilizing the proper tools, then the intelligent AR-assisted repair guidance program 110a, 110b may prompt the user with an error message. In at least one embodiment, the error message may include another set of 3D animated instructions for the user to follow in order to move to the next step and/or correct any erroneous actions by the user.

In at least one embodiment, the intelligent AR-assisted repair guidance program 110a, 110b may recognize the state of the object after an interruption in the pose-assisted active visual recognition process 200. If the user fails to follow the 3D animated instructions for a previously determined period of time (e.g., three minutes), or is interrupted by another application on the user mobile device (e.g., user receives a phone call, text message or email), the intelligent AR-assisted repair guidance program 110a, 110b may suspend the pose-assisted active visual recognition process 200, until the intelligent AR-assisted repair guidance program 110a, 110b detects user activity on the object, the user closes any other application associated with the user mobile device, or the user activates the screen associated with the user mobile device in which the 3D animated instructions are presented.

Continuing the previous example, since the intelligent AR-assisted repair guidance program 110a, 110b determines that the door knob is malfunctioning because the latch bolt remains in the retracted position, the intelligent AR-assisted repair guidance program 110a, 110b identifies the repair action as repairing the jammed latch bolt. The intelligent AR-assisted repair guidance program 110a, 110b then provides 3D animated instructions on the screen of the user mobile device directing User A on how to fix the jammed latch bolt. First, the intelligent AR-assisted repair guidance program 110a, 110b shows a scene kit or list of tools to fix the jammed latch bolt that includes a can of lubricant, large flat head screw driver, Phillips screw driver, and needle nose pliers. The intelligent AR-assisted repair guidance program 110a, 110b then instructs User A to perform the following steps:

Step 1: Take off the door handle by using the Phillips screw driver to unscrew both screws on the door handle.

Step 2: Open the latch manually with either a large flathead screw driver or a pair of needle nose pliers.

Step 3: Spray the lubricant on the latch bolt.

Step 4: Press latch to determine if the latch is moving freely.

Step 5: Then replace the latch and the door handle.

With each step, the intelligent AR-assisted repair guidance program 110a, 110b uses crosses or visual aids to point to the appropriate image feature referred to in the step on the screen of the user mobile device. Once a step is completed, User A proceeds to the next step as instructed by the intelligent AR-assisted repair guidance program 110a, 110b.

The functionality of a computer may be improved by the intelligent AR-assisted repair guidance program 110a, 110b because the intelligent AR-assisted repair guidance program 110a, 110b may be designed for mobile applications, and may leverage a combination of visual information from selected most informative video frames (e.g., pose data regarding the motion or rotation speed) to select the best quality video frame thereby creating a more intuitive and engaging approach to existing AR-assisted repair and traditional hardware repair guidance. The intelligent AR-assisted repair guidance program 110a, 110b may utilize one or more cameras (e.g., 6-DOF cameras) to train a deep learning model for extracting image feature and aggregating visual information from filtered video frames for final classification.

Additionally, existing visual recognition approaches, which may rely on two-dimensional (2D) images to train underlying models, lack fine-grained visual recognition. However, the intelligent AR-assisted repair guidance program 110a, 110b may utilize an on-device actual visual analysis process (e.g., pose-assisted video frame filtering approach) for fine-grained visual recognition. The intelligent AR-assisted repair guidance program 110a, 110b may also identify points of interests (POIs) to recognize the state of complex 3D objects, including object classification of such complex 3D objects, in which the 3D objects may be dynamic (not static) with changes to configuration and appearance. Therefore, the intelligent AR-assisted repair guidance program 110a, 110b may improve computer functionality by creating fine-grained visual recognition of objects and enabling accurate object classification.

Further, the intelligent AR-assisted repair guidance program 110a, 110b may contribute true value to AR-assisted repair to a wide variety of users with different levels of knowledge by automatically understanding the particular state of the repair action and superimposing step-by-step 3D animated instructions to users for the hardware repair. Specifically, the intelligent AR-assisted repair guidance program 110a, 110b may utilize POI indicators in AR to guide the user when collecting a complete visual information for recognizing and ensuring accuracy, as well as filtering the POI indicators that have changes to guide the user during the repair process. Therefore, the intelligent AR-assisted repair guidance program 110a, 110b may improve computer functionality by overlaying real world hardware with virtual material, and filtering unimportant visual information during the repair process to improve user experience.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
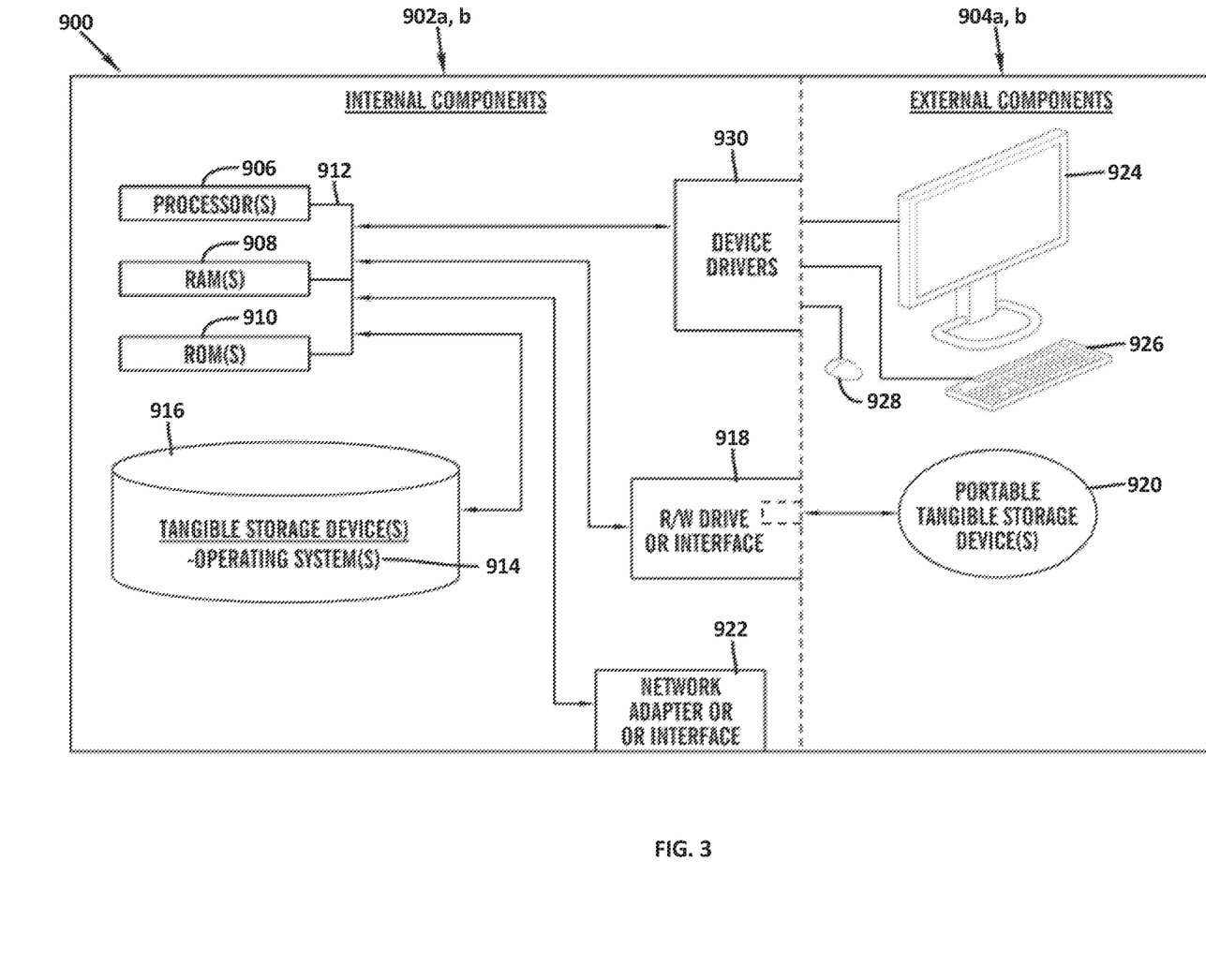
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the intelligent AR-assisted repair guidance program 110a in client computer 102, and the intelligent AR-assisted repair guidance program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the intelligent AR-assisted repair guidance program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the intelligent AR-assisted repair guidance program 110a in client computer 102 and the intelligent AR-assisted repair guidance program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the intelligent AR-assisted repair guidance program 110a in client computer 102 and the intelligent AR-assisted repair guidance program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
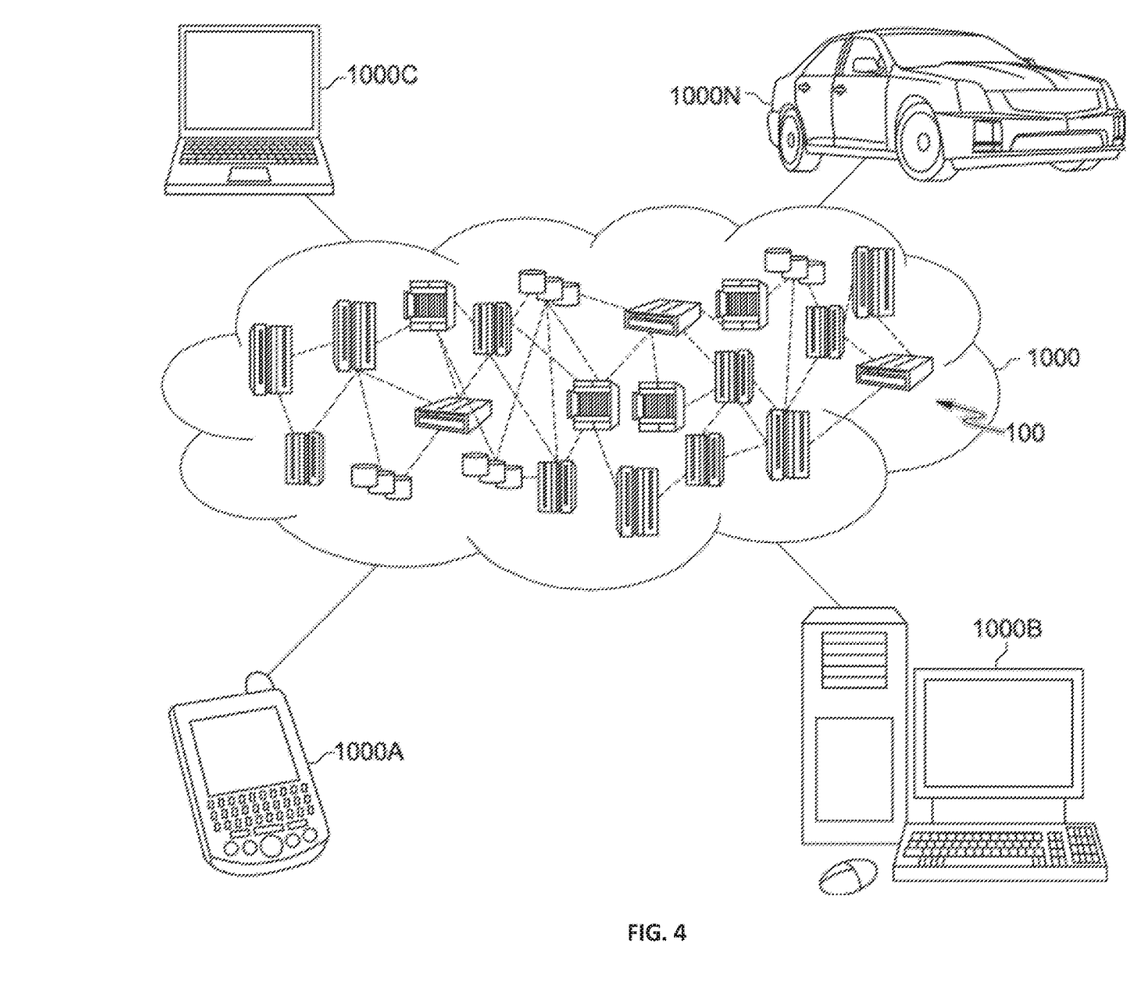
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
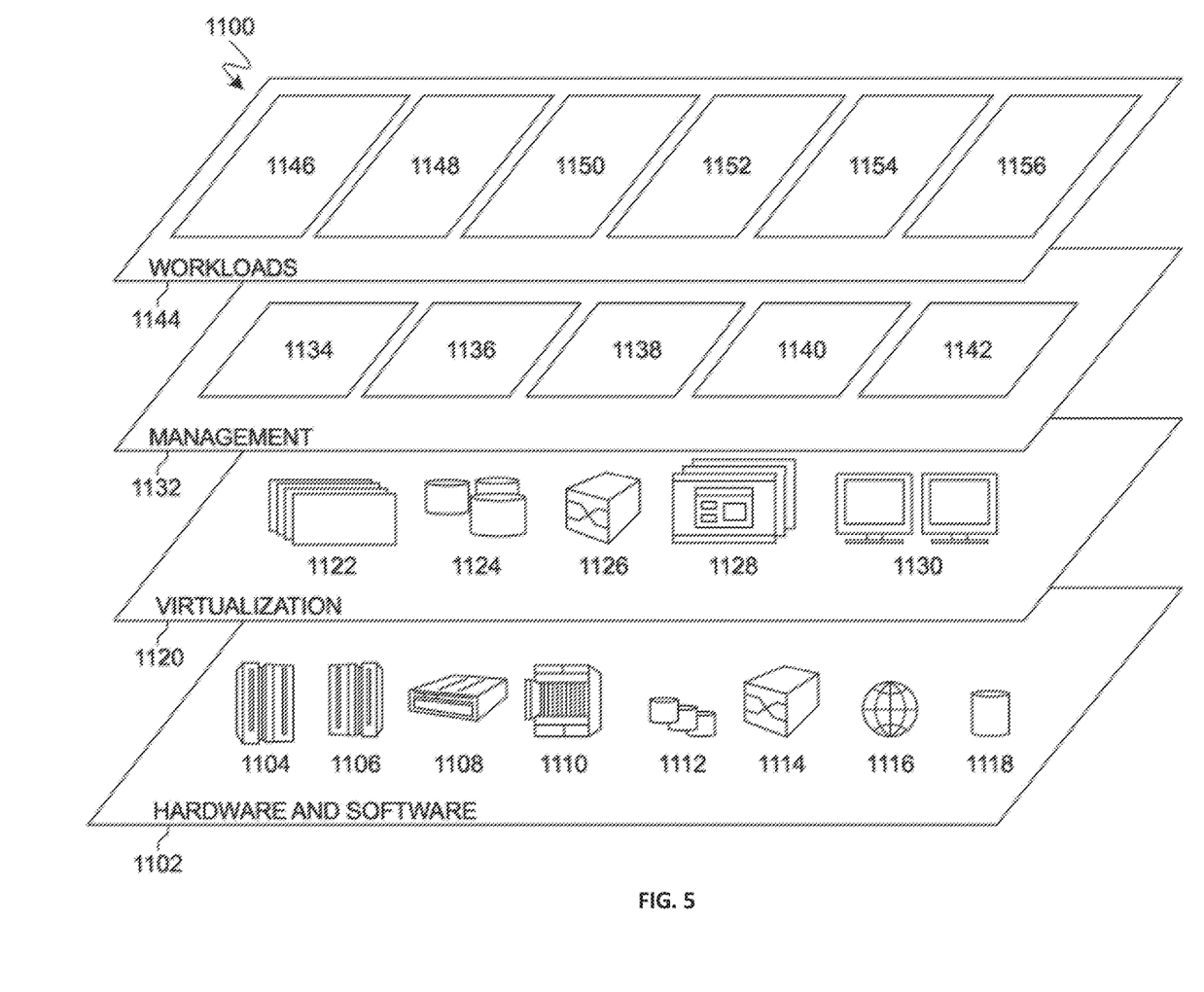
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and intelligent AR-assisted repair guidance 1156. An intelligent AR-assisted repair guidance program 110a, 110b provides a way to intelligently provide AR-assisted repair guidance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for intelligently generating an augmented reality (AR)-assisted repair guidance for a user, the method comprising:
   detecting a scan of an object on a user mobile device;
   filtering one or more pose-controlled video frames, wherein the filtered one or more pose-controlled video frames include the object, by:
      calibrating an initial pose of the object, wherein a plurality of video frames are captured by one or more cameras associated with the user mobile device;
      automatically clustering one or more informative poses associated with the captured plurality of video frames;
      aggregating the one or more clustered informative poses associated with the captured plurality of video frames by a convolutional neural network (CNN), wherein a plurality of most informative poses are selected; and
      filtering the selected plurality of most informative poses based on a plurality of pose data associated with each of the most informative poses in the selected plurality of most informative poses, thereby generating the one or more filtered pose-controlled video frames;
   extracting at least one new image feature by utilizing the (CNN) based on the filtered one or more pose-controlled video frames;
   aggregating a plurality of visual information associated with the object by utilizing the CNN, wherein the extracted at least one new image feature is included in the aggregated plurality of visual information; and
   presenting three dimensional (3D) animated instructions to the user, wherein the 3D animated instructions include an AR-assisted repair guidance for the object.

2. The method of claim 1, wherein calibrating the initial pose of the object, wherein the plurality of video frames are captured by one or more cameras associated with the user mobile device, further comprises:
   instructing, the user, on a plurality of positions and a plurality of directions to point the one or more cameras associated with the user mobile device toward the object, wherein the object and the user mobile device are in the same coordinate for a consistent initial relative pose.

3. The method of claim 2, further comprising:
   identifying one or more points of interest (POIs) associated with the object; and
   focusing the one or more cameras associated with the user mobile device to capture a plurality of poses to include the identified one or more POIs associated with the object.

4. The method of claim 1, wherein presenting the three dimensional (3D) animated instructions to the user, wherein the 3D animated instructions include the AR-assisted repair guidance for the object, further comprises:
   verifying that one or more pre-requisites associated with each step of the 3D animated instructions is satisfied by utilizing one or more cameras, wherein the one or more pre-requisites include the utilization of a plurality of proper tools; and
   in response to verifying that the one or more pre-requisites has been satisfied, proceeding to a next step of the 3D animated instructions.

5. The method of claim 1, wherein filtering the selected plurality of most informative poses based on the plurality of pose data associated with each of the most informative poses in the selected plurality of most informative poses, further comprises:
   retrieving the selected plurality of most informative poses associated with the captured plurality of video frames; and
   selecting a plurality of most stable video frames from the retrieved plurality of most informative poses based on the pose data associated with each captured video frame by utilizing one or more inertial sensors.

6. The method of claim 1, wherein extracting at least one new image feature by utilizing the convolutional neural network (CNN) based on the filtered one or more pose-controlled video frames, further comprising:
   receiving the filtered one or more pose-controlled video frames;
   dividing the received filtered one or more pose-controlled video frames into a plurality of individual video frames;
   dividing the plurality of individual video frames into a plurality of images associated with each of the individual video frames in the plurality of individual video frames;
   identifying a plurality of image features associated with the plurality of images; and
   in response to determining the at least one new image feature is associated with the identified plurality of image features associated with the object, extracting the determined at least one new image feature.

7. The method of claim 6, further comprising:
   in response to determining no new image feature is associated with the identified plurality of image features associated with the object, receiving a plurality of previously used extracted image features associated with the object.

8. The method of claim 1, wherein aggregating the plurality of visual information associated with the object by utilizing the CNN, wherein the extracted at least one new image features is included in the aggregated plurality of visual information, further comprises:
   concatenating the plurality of visual information associated with the object;
   receiving the concatenated plurality of visual information by a deep neural network; and
   producing, as an output, a recognized state associated with the object.

9. A computer system for intelligently generating an augmented reality (AR)-assisted repair guidance for a user, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

detecting a scan of an object on a user mobile device;

filtering one or more pose-controlled video frames, wherein the filtered one or more pose-controlled video frames include the object, by:

calibrating an initial pose of the object, wherein a plurality of video frames are captured by one or more cameras associated with the user mobile device;

automatically clustering one or more informative poses associated with the captured plurality of video frames;

aggregating the one or more clustered informative poses associated with the captured plurality of video frames by a convolutional neural network (CNN), wherein a plurality of most informative poses are selected; and filtering the selected plurality of most informative poses based on a plurality of pose data associated with each of the most informative poses in the selected plurality of most informative poses, thereby generating the one or more filtered pose-controlled video frames;

extracting at least one new image feature by utilizing the (CNN) based on the filtered one or more pose-controlled video frames;

aggregating a plurality of visual information associated with the object by utilizing the CNN, wherein the extracted at least one new image feature is included in the aggregated plurality of visual information; and presenting three dimensional (3D) animated instructions to the user, wherein the 3D animated instructions include an AR-assisted repair guidance for the object.

10. The computer system of claim 9, wherein calibrating the initial pose of the object, wherein the plurality of video frames are captured by one or more cameras associated with the user mobile device, further comprises:

instructing, the user, on a plurality of positions and a plurality of directions to point the one or more cameras associated with the user mobile device toward the object, wherein the object and the user mobile device are in the same coordinate for a consistent initial relative pose.

11. The computer system of claim 9, wherein presenting the three dimensional (3D) animated instructions to the user, wherein the 3D animated instructions include the AR-assisted repair guidance for the object, further comprises:

verifying that one or more pre-requisites associated with each step of the 3D animated instructions is satisfied by utilizing one or more cameras, wherein the one or more pre-requisites include the utilization of a plurality of proper tools; and in response to verifying that the one or more pre-requisites has been satisfied, proceeding to a next step of the 3D animated instructions.

12. The computer system of claim 9, wherein filtering the selected plurality of most informative poses based on the plurality of pose data associated with each of the most informative poses in the selected plurality of most informative poses, further comprises:

retrieving the selected plurality of most informative poses associated with the captured plurality of video frames; and selecting a plurality of most stable video frames from the retrieved plurality of most informative poses based on the pose data associated with each captured video frame by utilizing one or more inertial sensors.

13. The computer system of claim 9, wherein extracting at least one new image feature by utilizing the convolutional neural network (CNN) based on the filtered one or more pose-controlled video frames, further comprises:

receiving the filtered one or more pose-controlled video frames;

dividing the received filtered one or more pose-controlled video frames into a plurality of individual video frames;

dividing the plurality of individual video frames into a plurality of images associated with each of the individual video frames in the plurality of individual video frames;

identifying a plurality of image features associated with the plurality of images; and in response to determining the at least one new image feature is associated with the identified plurality of image features associated with the object, extracting the determined at least one new image feature.

14. A computer program product for intelligently generating an augmented reality (AR)-assisted repair guidance for a user, comprising:

one or more non-transitory computer-readable storage media and program instructions stored on at least one of the one or more non-transitory computer-readable storage media, the program instructions executable by a processor to cause the processor to perform a method comprising:

detecting a scan of an object on a user mobile device;

filtering one or more pose-controlled video frames, wherein the filtered one or more pose-controlled video frames include the object, by:

calibrating an initial pose of the object, wherein a plurality of video frames are captured by one or more cameras associated with the user mobile device;

automatically clustering one or more informative poses associated with the captured plurality of video frames;

aggregating the one or more clustered informative poses associated with the captured plurality of video frames by a convolutional neural network (CNN), wherein a plurality of most informative poses are selected; and filtering the selected plurality of most informative poses based on a plurality of pose data associated with each of the most informative poses in the selected plurality of most informative poses, thereby generating the one or more filtered pose-controlled video frames;

extracting at least one new image feature by utilizing the (CNN) based on the filtered one or more pose-controlled video frames;

aggregating a plurality of visual information associated with the object by utilizing the CNN, wherein the extracted at least one new image feature is included in the aggregated plurality of visual information; and presenting three dimensional (3D) animated instructions to the user, wherein the 3D animated instructions include an AR-assisted repair guidance for the object.

15. The computer program product of claim 14, wherein calibrating the initial pose of the object, wherein the plurality of video frames are captured by one or more cameras associated with the user mobile device, further comprises:

instructing, the user, on a plurality of positions and a plurality of directions to point the one or more cameras associated with the user mobile device toward the object, wherein the object and the user mobile device are in the same coordinate for a consistent initial relative pose.

16. The computer program product of claim 15, further comprising:

identifying one or more points of interest (POIs) associated with the object; and focusing the one or more cameras associated with the user mobile device to capture a plurality of poses to include the identified one or more POIs associated with the object.

17. The computer program product of claim 14, wherein extracting at least one new image feature by utilizing the convolutional neural network (CNN) based on the filtered one or more pose-controlled video frames, further comprising:

receiving the filtered one or more pose-controlled video frames;

dividing the received filtered one or more pose-controlled video frames into a plurality of individual video frames;

dividing the plurality of individual video frames into a plurality of images associated with each of the individual video frames in the plurality of individual video frames;

identifying a plurality of image features associated with the plurality of images; and in response to determining the at least one new image feature is associated with the identified plurality of image features associated with the object, extracting the determined at least one new image feature.

* * * * *